(12) United States Patent
Khlat (10) Patent No.: US 9,853,698 B2
(45) Date of Patent: Dec. 26, 2017

(54) CA FDD-FDD AND FDD-TDD ARCHITECTURE

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/991,090

(22) Filed: Jan. 8, 2016

(65) Prior Publication Data

US 2016/0323080 A1 Nov. 3, 2016

Related U.S. Application Data

(60) Provisional application No. 62/154,447, filed on Apr. 29, 2015.

(51) Int. Cl.
| | |
|---|---|
| *H04B 1/38* | (2015.01) |
| *H04B 7/04* | (2017.01) |
| *H04B 7/06* | (2006.01) |
| *H04B 7/08* | (2006.01) |
| *H04L 5/00* | (2006.01) |
| *H04B 7/0413* | (2017.01) |

(52) U.S. Cl.
CPC .............. *H04B 7/0413* (2013.01); *H04B 1/38* (2013.01); *H04B 7/0602* (2013.01); *H04B 7/0802* (2013.01); *H04L 5/001* (2013.01); *H04L 5/0041* (2013.01)

(58) Field of Classification Search
CPC ...... H04B 1/0057; H04B 1/06; H04B 1/0064; H04B 1/38; H04B 7/0404; H04B 7/0413; H04B 7/0802; H04L 5/001; H04L 5/0041
See application file for complete search history.

(56) References Cited

U.S. PATENT DOCUMENTS

| | | | | |
|---|---|---|---|---|
| 2014/0024322 | A1* | 1/2014 | Khlat ................ | H04B 7/0404 455/78 |
| 2014/0293841 | A1* | 10/2014 | Rousu ............... | H04B 1/006 370/278 |
| 2015/0349907 | A1* | 12/2015 | Narathong ......... | H04J 4/00 370/280 |
| 2015/0372702 | A1* | 12/2015 | Asuri ................ | H04B 1/1027 455/77 |
| 2015/0373711 | A1* | 12/2015 | Narathong ........ | H04W 72/0453 370/280 |

\* cited by examiner

*Primary Examiner* — David B. Lugo
(74) *Attorney, Agent, or Firm* — Withrow & Terranova, P.L.L.C.

(57) ABSTRACT

Radio frequency (RF) front end circuitry includes RF filtering circuitry with first multiplexer circuitry and second multiplexer circuitry. The first multiplexer circuitry is used to pass primary RF transmit and receive signals within one or more frequency division duplexing (FDD) operating bands and diversity multiple-input-multiple-output (MIMO) receive signals within one or more time division duplexing (TDD) operating bands between transceiver circuitry and one or more antennas. The second multiplexer circuitry is used to pass primary RF transmit and receive signals within the one or more TDD operating bands and diversity MIMO receive signals within the one or more FDD operating bands between the transceiver circuitry and the one or more antennas.

16 Claims, 5 Drawing Sheets

| LTE BAND NUMBER | UPLINK (MHz) | DOWNLINK (MHz) |
|---|---|---|
| 1 | 1920-1980 | 2110-2170 |
| 2 | 1850-1910 | 1930-1990 |
| 3 | 1710-1785 | 1805-1880 |
| 4 | 1710-1755 | 2110-2155 |
| 5 | 824-849 | 869-894 |
| 6 | 830-840 | 875-885 |
| 7 | 2500-2570 | 2620-2690 |
| 8 | 880-915 | 925-960 |
| 9 | 1749.9-1784.9 | 1844.9-1879.9 |
| 10 | 1710-1770 | 2110-2170 |
| 11 | 1427.9-1452.9 | 1475.9-1500.9 |
| 12 | 698-716 | 728-746 |
| 13 | 777-787 | 746-756 |
| 14 | 788-798 | 758-768 |
| 15 | 1900-1920 | 2600-2620 |
| 16 | 2010-2025 | 2585-2600 |
| 17 | 704-716 | 734-746 |
| 18 | 815-830 | 860-875 |
| 19 | 830-845 | 875-890 |
| 20 | 832-862 | 791-821 |
| 21 | 1447.9-1462.9 | 1495.9-1510.9 |
| 22 | 3410-3500 | 3510-3600 |
| 23 | 2000-2020 | 2180-2200 |
| 24 | 1625.5-1660.5 | 1525-1559 |
| 25 | 1850-1915 | 1930-1995 |
| 26 | 814-849 | 859-894 |
| 27 | 807-824 | 852-869 |
| 28 | 703-748 | 758-803 |
| 29 | n/a | 717-728 |
| 30 | 2305-2315 | 2350-2360 |
| 31 | 452.5-457.5 | 462.5-467.5 |

*FIG. 1A*
*(RELATED ART)*

| LTE BAND NUMBER | ALLOCATION (MHz) |
|---|---|
| 33 | 1900-1920 |
| 34 | 2010-2025 |
| 35 | 1850-1910 |
| 36 | 1930-1990 |
| 37 | 1910-1930 |
| 38 | 2570-2620 |
| 39 | 1880-1920 |
| 40 | 2300-2400 |
| 41 | 2496-2690 |
| 42 | 3400-3600 |
| 43 | 3600-3800 |
| 44 | 703-803 |

CA FDD-FDD AND FDD-TDD ARCHITECTURE

RELATED APPLICATIONS

This application claims the benefit of U.S. provisional patent application No. 62/154,447, filed Apr. 29, 2015, the disclosure of which is incorporated herein by reference in its entirety.

FIELD OF THE DISCLOSURE

The present disclosure relates to radio frequency (RF) front end circuitry, and specifically to RF front end circuitry for one or more carrier aggregation configurations.

BACKGROUND

Modern mobile telecommunications standards continue to demand increasingly greater rates of data exchange (data rates). One way to increase the data rate of a wireless communications device is through the use of carrier aggregation. Carrier aggregation allows a single wireless communications device to aggregate bandwidth across one or more operating bands in the wireless spectrum. The increased bandwidth achieved as a result of carrier aggregation allows a wireless communications device to obtain higher data rates than have previously been available.

Figure 1A:
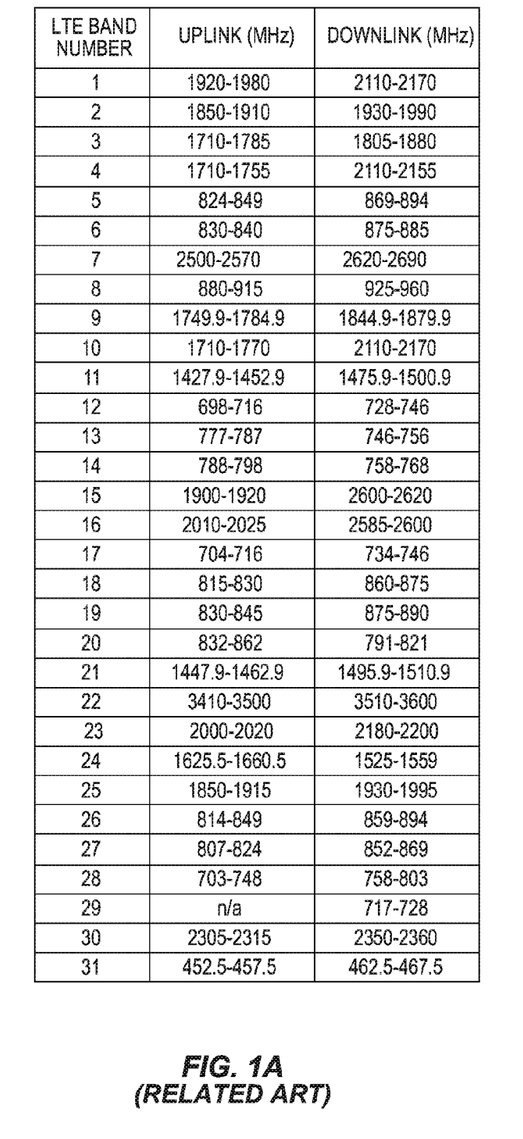
FIGS. 1A and 1B are tables showing a number of Third Generation Partnership Project (3GPP) Long Term Evolution (LTE) operating bands.
Figure 1B:
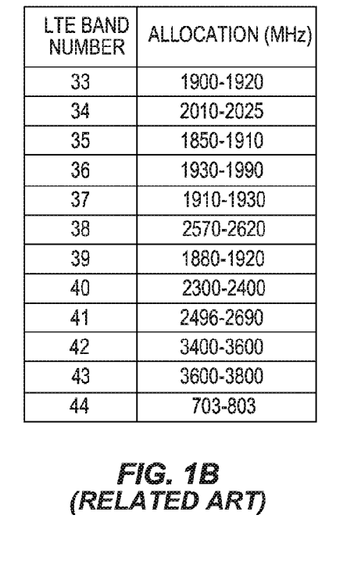

FIGS. 1A and 1B show tables describing a number of wireless communication operating bands in the wireless spectrum. Specifically, FIG. 1A shows a table describing a number of frequency division duplexing (FDD) operating bands, while FIG. 1B shows a table describing a number of time division duplexing (TDD) operating bands as defined by Third Generation Partnership Project (3GPP) Long Term Evolution (LTE) standards. The first column in FIGS. 1A and 1B indicates the operating band number for each one of the operating bands. The second column in FIGS. 1A and 1B indicate the uplink frequency band for each one of the operating bands. The third column in FIG. 1A indicates the downlink frequency band for each one of the operating bands. Since the operating bands shown in FIG. 1B are TDD operating bands, the uplink and downlink frequency bands are the same. In non-carrier aggregation configurations, a wireless communications device will generally communicate using a single portion of the uplink or downlink frequency bands within a single operating band. In carrier aggregation applications, however, a wireless communications device may aggregate bandwidth across a single operating band or multiple operating bands in order to increase the data rate of the device.

Figure 2A:
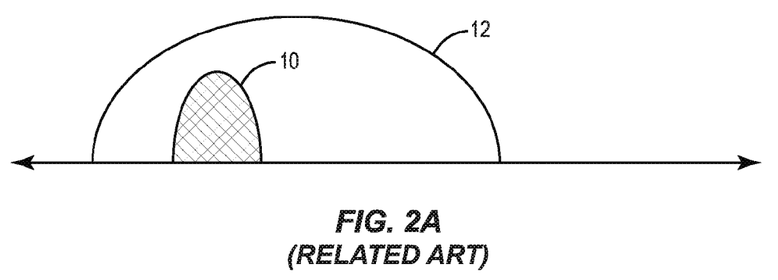
FIGS. 2A through 2D are graphs illustrating a number of carrier aggregation configurations.

FIG. 2A shows a diagram representing a conventional, non-carrier aggregation configuration for a wireless communications device. In this conventional configuration, a wireless communications device communicates using a single portion of the wireless spectrum 10 within a single operating band 12. Under the conventional approach, the data rate of the wireless communications device is constrained by the limited available bandwidth.

Figure 2B:
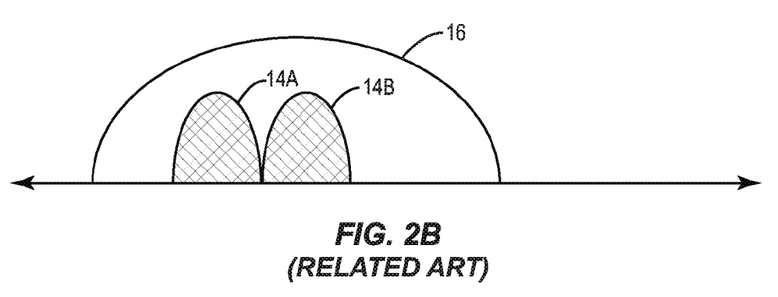
Figure 2C:
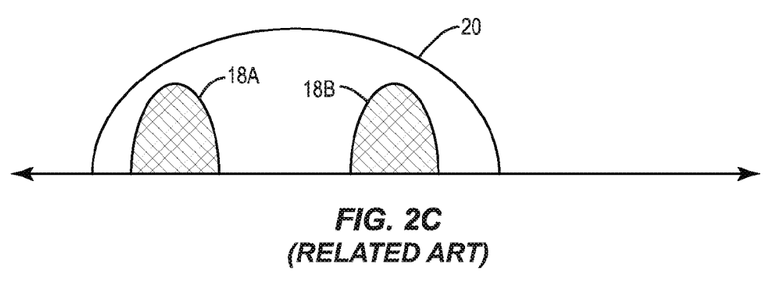
Figure 2D:
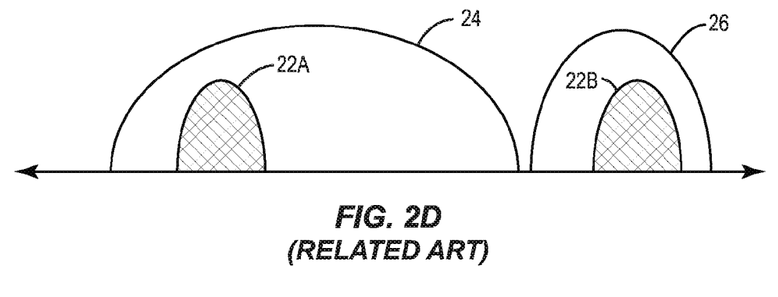

FIGS. 2B-2D show diagrams representing a variety of carrier aggregation configurations for a wireless communications device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern wireless communications device should be capable of supporting each one of the previously described carrier aggregation configurations.

The various carrier aggregation configurations discussed above can be performed between two or more FDD operating bands, two or more TDD operating bands, or a combination thereof. Generally, a wireless communications device will aggregate bandwidth when receiving data (i.e., during downlink), but will use a single operating band when transmitting data (i.e., during uplink). However, carrier aggregation may also be used during data transfer to increase uplink throughput.

Figure 3:
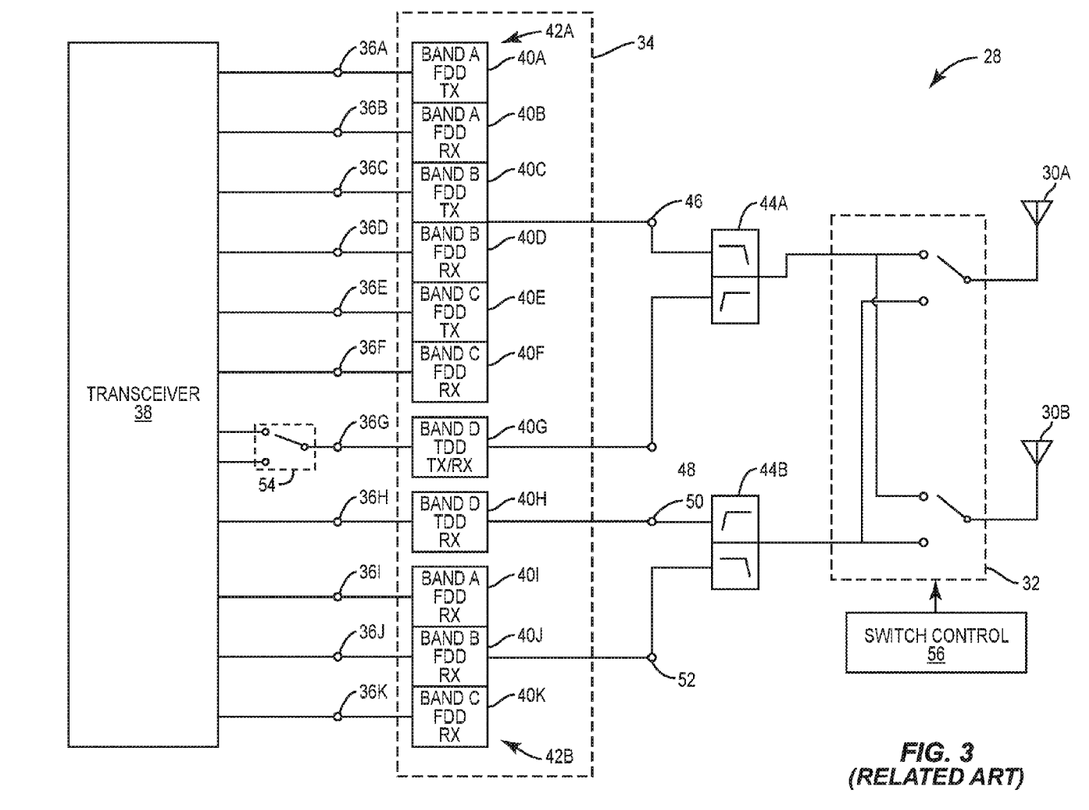
FIG. 3 is a schematic representation of conventional radio frequency (RF) front end circuitry.

FIG. 3 shows a schematic representation of conventional radio frequency (RF) front end circuitry 28 configured to support at least one carrier aggregation configuration. The conventional RF front end circuitry 28 includes a first antenna 30A, a second antenna 30B, antenna switching circuitry 32 coupled to the first antenna 30A and the second antenna 30B, RF filtering circuitry 34 coupled between the antenna switching circuitry 32 and a number of input/output nodes 36 (shown individually as 36A through 36K), and transceiver circuitry 38 coupled to the input/output nodes 36. The RF filtering circuitry 34 includes a number of filters 40 (shown individually as 40A through 40K), which are grouped into first multiplexer circuitry 42A and second multiplexer circuitry 42B. Specifically, a number of the filters 40 configured to support one or more FDD operating bands are grouped into the first multiplexer 42A and the second multiplexer 42B, while a number of the filters 40 configured to support one or more TDD operating bands are provided individually and thus are isolated from the other filters 40. A first diplexer 44A and a second diplexer 44B separate FDD signals from TDD signals as discussed in detail below.

The first multiplexer 42A includes a first filter 40A coupled between a first common node 46 and a first input/output node 36A, a second filter 40B coupled between the first common node 46 and a second input/output node 36B, a third filter 40C coupled between the first common node 46 and a third input/output node 36C, a fourth filter 40D coupled between the first common node 46 and a fourth input/output node 36D, a fifth filter 40E coupled between the first common node 46 and a fifth input/output node 36E, and a sixth filter 40F coupled between the first common node 46 and a sixth input/output node 36F.

A seventh filter 40G is coupled between a first isolated filter node 48 and a seventh input/output node 36G.

An eighth filter 40H is coupled between a second isolated filter node 50 and an eighth input/output node 36H.

The second multiplexer 42B includes a ninth filter 40I coupled between a second common node 52 and a ninth input/output node 36I, a tenth filter 40J coupled between the second common node 52 and a tenth input/output node 36J, and an eleventh filter 40K coupled between the second common node 52 and an eleventh input/output node 36K.

The RF filtering circuitry 34 is configured to selectively pass RF transmit signals and RF receive signals within a first operating band (band A), a second operating band (band B), a third operating band (band C), and a fourth operating band (band D) between the antenna switching circuitry 32 and the transceiver circuitry 38, where the first operating band (band A), the second operating band (band B), and the third operating band (band C) are FDD operating bands, and the fourth operating band (band D) is a TDD operating band. As discussed below, the RF filtering circuitry 34 facilitates at least one carrier aggregation configuration in the conventional RF front end circuitry 28.

The filter response of each one of the filters 40 includes a pass band configured to pass RF signals within a particular frequency range, while attenuating other signals. Specifically, the pass band of each one of the filters 40 is designed to pass only those signals within a transmit or receive frequency band of a particular operating band (or multiple operating bands), such as the transmit and receive frequency bands shown above for each operating band in FIG. 1.

As shown in FIG. 3, a filter response of the first filter 40A includes a pass band configured to pass RF transmit signals within the first operating band (band A) while attenuating other signals. A filter response of the second filter 40B includes a pass band configured to pass RF receive signals within the first operating band (band A) while attenuating other signals. A filter response of the third filter 40C includes a pass band configured to pass RF transmit signals within the second operating band (band B) while attenuating other signals. A filter response of the fourth filter 40D includes a pass band configured to pass RF receive signals within the second operating band (band B) while attenuating other signals. A filter response of the fifth filter 40E includes a pass band configured to pass RF transmit signals within the third operating band (band C) while attenuating other signals. A filter response of the sixth filter 40F includes a pass band configured to pass RF receive signals within the third operating band (band C) while attenuating other signals.

A filter response of the seventh filter 40G includes a pass band configured to pass RF transmit signals and RF receive signals within the fourth operating band (band D) while attenuating other signals. Because the fourth operating band (band D) is a TDD band where RF transmit signals and RF receive signals are in the same frequency band, a transmit/receive switch 54 is coupled between the seventh filter 40G and the transceiver circuitry 38 to switch the output of the seventh filter 40G between separate transmit and receive signal paths in the transceiver circuitry 38. A filter response of the eighth filter 40H includes a pass band configured to pass RF receive signals within the fourth operating band (band D) while attenuating other signals. As discussed in detail below, since the eighth filter 40H is used only for receiving diversity multiple-input-multiple-output (MIMO) signals and thus does not need a transmit/receive switch.

A filter response of the ninth filter 40I includes a pass band configured to pass RF receive signals within the first operating band (band A) while attenuating other signals. A filter response of the tenth filter 40J includes a pass band configured to pass RF receive signals within the second operating band (band B) while attenuating other signals. A filter response of the eleventh filter 40K includes a pass band configured to pass RF receive signals within the third operating band (band C) while attenuating other signals.

The conventional RF front end circuitry 28 is capable of operating in a standard (i.e., non-carrier aggregation) mode in any one of the first operating band (band A), the second operating band (band B), the third operating band (band C), and the fourth operating band (band D). During standard modes, a first one of the antennas 30 is used to transmit and receive primary signals within a single operating band, while a second one of the antennas 30 is used to receive a diversity MIMO signal within the same operating band. Generally, the first multiplexer 42A and the seventh filter 40G are used for the primary transmission and reception of RF signals for the various operating bands, while the second multiplexer 42B and the eighth filter 40H are used for the reception of diversity or MIMO receive signals. The particular one of the antennas 30 used for transmission may be changed based on one or more performance characteristics of each one of the antennas 30 (e.g., voltage standing wave ratio), and may be dynamically swapped by the antenna switching circuitry 32 in order to optimize transmission and/or reception. In particular, switch control circuitry 56 coupled to the antenna switching circuitry 32 may provide control signals to the antenna switching circuitry 32 in order to swap the first antenna 30A and the second antenna 30B.

The conventional RF front end circuitry 28 is further configured to operate in several carrier aggregation configurations in which bandwidth between the first operating band (band A), the second operating band (band B), the third operating band (band C), and the fourth operating band (band D) is aggregated. In the various carrier aggregation modes of the conventional RF front end circuitry 28, an RF transmit signal in one of the operating bands is provided to either the first RF multiplexer circuitry 42A or the seventh filter 40G, where it is passed by the first diplexer 44A to one of the antennas 30 via the antenna switching circuitry 34. RF receive signals in two or more of the operating bands are received at both the first antenna 30A and the second antenna 30B and separately delivered to the transceiver circuitry 38 by the RF filtering circuitry 34. As discussed above, the first RF multiplexer circuitry 42A and the seventh filter 42G are generally used for the reception of primary signals, while the second RF multiplexer circuitry 42B and the eighth filter 42H are generally used for the reception of diversity or MIMO signals. Because the first operating band (band A), the second operating band (band B), and the third operating band (band C) are FDD operating bands, while the fourth operating band (band D) is a TDD operating band, there may be a relatively large frequency delta between these signals (as TDD operating bands are sometimes significantly higher in frequency than FDD operating bands). As will be appreciated by those skilled in the art, the larger the separation between pass bands in various filters, the more loading they generally present to one another. Accordingly, the first diplexer 44A and the second diplexer 44B are provided to isolate the first RF multiplexer circuitry 42A from the seventh filter 40G and the second RF multiplexer 42B from the eighth filter 40H, respectively.

While the conventional RF multiplexer circuitry 28 is capable of operating in carrier aggregation configurations using the first operating band (band A), the second operating band (band B), the third operating band (band C), and the fourth operating band (band D), the first diplexer 44A and the second diplexer 44B may significantly degrade the performance of the circuitry. Specifically, the first diplexer 44A and the second diplexer 44B may add significant insertion loss in the transmit and receive paths of the antennas 30. Accordingly, there is a need for RF front end circuitry capable of supporting carrier aggregation between FDD operating bands and TDD operating bands with improved performance.

SUMMARY

The present disclosure relates to radio frequency (RF) front end circuitry, and specifically to RF front end circuitry for one or more carrier aggregation configurations. In one embodiment, RF front end circuitry includes a number of antenna nodes, antenna switching circuitry coupled to the antenna nodes, a number of input/output nodes, transceiver circuitry coupled to the input/output nodes, and RF filtering circuitry coupled between the antenna switching circuitry and the number of input/output nodes. The RF filtering circuitry includes first multiplexer circuitry and second multiplexer circuitry. The first multiplexer circuitry includes a first set of filters configured to pass primary RF transmit signals within one or more frequency division duplexing (FDD) operating bands, pass RF receive signals within the one or more FDD operating bands, and pass diversity multiple-input-multiple-output (MIMO) receive signals within one or more time division duplexing (TDD) operating bands between the antenna switching circuitry and different ones of the input/output nodes, while attenuating other signals. The second multiplexer circuitry includes a second set of filters configured to pass primary RF transmit signals within the one or more TDD operating bands, pass primary RF receive signals within the one or more TDD operating bands, and pass diversity MIMO receive signals within the one or more FDD operating bands between the antenna switching circuitry and different ones of the input/output nodes, while attenuating other signals.

Providing the first multiplexer circuitry and the second multiplexer circuitry and using them as described above allows the RF front end circuitry to support carrier aggregation configurations between FDD operating bands and TDD operating bands with less filtering circuitry than is required using conventional solutions. This in turn decreases insertion loss in the RF signal path of the RF front end circuitry, thereby improving the performance thereof. Further, the size of the RF filtering circuitry is decreased.

In one embodiment, a method of operating RF front end circuitry includes passing primary RF transmit signals within one or more FDD operating bands between transceiver circuitry and one or more antennas via first multiplexer circuitry, passing primary RF receive signals within the one or more FDD operating bands between the one or more antennas and the transceiver circuitry via the first multiplexer circuitry, passing diversity MIMO receive signals within one or more TDD operating bands between the one or more antennas and the transceiver circuitry via the first multiplexer circuitry, passing primary RF transmit signals within the one or more TDD operating bands between the transceiver circuitry and the one or more antennas via second multiplexer circuitry, passing primary RF receive signals within the one or more TDD operating bands between the one or more antennas and the transceiver circuitry via the second multiplexer circuitry, and passing diversity MIMO receive signals within the one or more FDD operating bands between the one or more antennas and the transceiver circuitry via the second multiplexer circuitry.

Operating the first multiplexer circuitry and the second multiplexer circuitry as described above allows the RF front end circuitry to support carrier aggregation configurations between FDD operating bands and TDD operating bands with less filtering circuitry than is required using conventional solutions. This in turn decreases insertion loss in the RF signal path of the RF front end circuitry, thereby improving the performance thereof. Further, the size of the RF filtering circuitry is decreased.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 4:
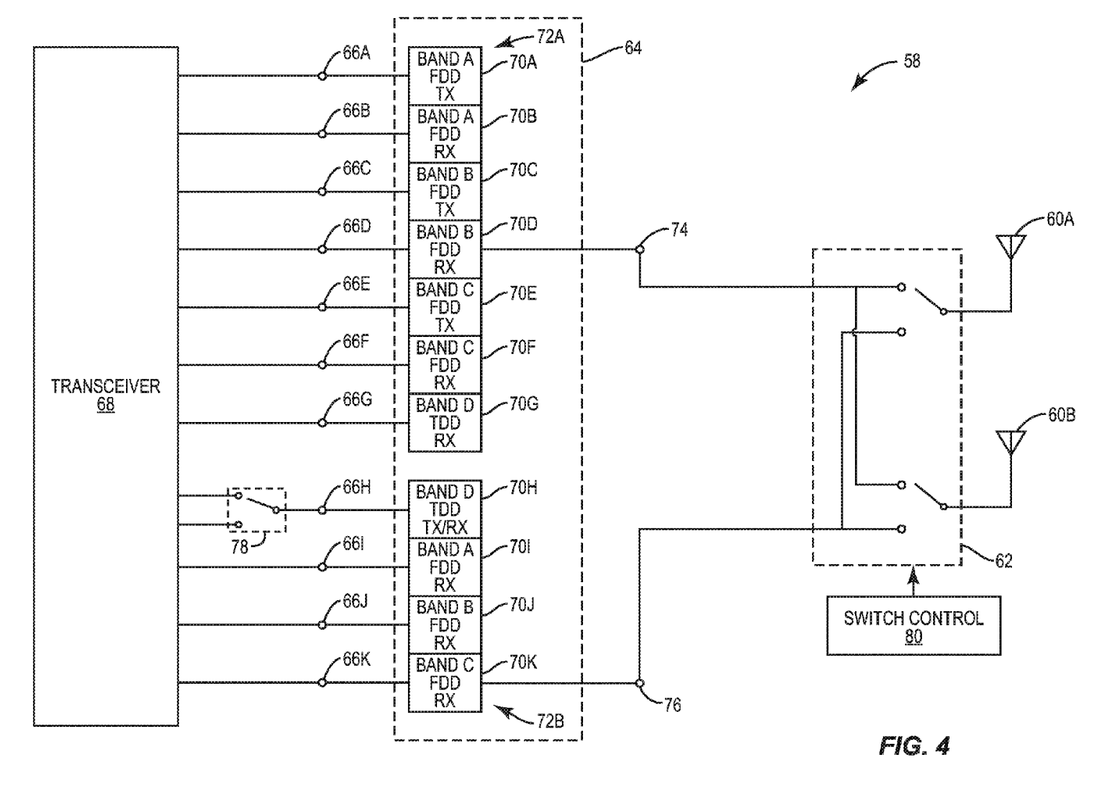
FIG. 4 is a schematic representation of RF front end circuitry according to one embodiment of the present disclosure.

FIG. 4 shows a schematic representation of radio frequency (RF) front end circuitry 58 according to one embodiment of the present disclosure. The RF front end circuitry 58 includes a first antenna 60A, a second antenna 60B, antenna switching circuitry 62 coupled to the first antenna 60A and the second antenna 60B, RF filtering circuitry 64 coupled between the antenna switching circuitry 62 and a number of input/output nodes 66 (shown individually as 66A through 66K), and transceiver circuitry 68 coupled to the input/output nodes 66. The RF filtering circuitry 64 includes a number of filters 70 (shown individually as 70A through 70K), which are grouped into first multiplexer circuitry 72A and second multiplexer circuitry 72B. Notably, the first multiplexer circuitry 72A and the second multiplexer circuitry 72B include filters 70 to support both frequency division duplexing (FDD) operating bands and time division duplexing (TDD) operating bands, as discussed in detail below.

The first multiplexer circuitry 72A includes a first filter 70A coupled between a first common node 74 and a first input/output node 66A, a second filter 70B coupled between the first common node 74 and a second input/output node 66B, a third filter 70C coupled between the first common node 74 and a third input/output node 66C, a fourth filter 70D coupled between the first common node 74 and a fourth input/output node 66D, a fifth filter 70E coupled between the first common node 74 and a fifth input/output node 66E, a sixth filter 70F coupled between the first common node 74 and a sixth input/output node 66F, and a seventh filter 70G coupled between the first common node 74 and a seventh input/output node 66G.

The second multiplexer circuitry 72B includes an eighth filter 70H coupled between a second common node 76 and an eighth input/output node 66H, a ninth filter 70I coupled between the second common node 76 and a ninth input/output node 66I, a tenth filter 70J coupled between the second common node 76 and a tenth input/output node 66J, and an eleventh filter 70K coupled between the second common node 76 and an eleventh input/output node 66K.

The RF filtering circuitry 64 is configured to selectively pass RF transmit signals and RF receive signals within a first operating band (band A), a second operating band (band B), a third operating band (band C), and a fourth operating band (band D) between the antenna switching circuitry 62 and the transceiver circuitry 68, where the first operating band (band A), the second operating band (band B), and the third operating band (band C) are FDD operating bands, and the fourth operating band (band D) is a TDD operating band.

As shown in FIG. 4, a filter response of the first filter 70A includes a pass band configured to pass RF transmit signals within the first operating band (band A) while attenuating other signals. A filter response of the second filter 70B includes a pass band configured to pass RF receive signals within the first operating band (band A) while attenuating other signals. A filter response of the third filter 70C includes a pass band configured to pass RF transmit signals within the second operating band (band B) while attenuating other signals. A filter response of the fourth filter 70D includes a pass band configured to pass RF receive signals within the second operating band (band B) while attenuating other signals. A filter response of the fifth filter 70E includes a pass band configured to pass RF transmit signals within the third operating band (band C) while attenuating other signals. A filter response of the sixth filter 70F includes a pass band configured to pass RF receive signals within the third operating band (band C) while attenuating other signals. A filter response of the seventh filter 70G includes a pass band configured to pass RF receive signals within the fourth operating band (band D) while attenuating other signals. While the fourth operating band (band D) is a TDD operating band in which RF transmit signals and RF receive signals are provided within the same frequency band, the seventh filter 70G is used only to provide diversity multiple-input-multiple-output (MIMO) receive signals to the transceiver circuitry 68, as discussed in detail below, and thus is coupled directly to the transceiver circuitry 68 with no transmit/receive switch.

A filter response of the eighth filter 70H includes a pass band configured to pass RF transmit signals and RF receive signals within the fourth operating band (band D) while attenuating other signals. Because the fourth operating band (band D) is a TDD band where RF transmit signals and RF receive signals are in the same frequency band, a transmit/receive switch 78 is coupled between the eighth input/output node 66H and the transceiver circuitry 68 to switch the output of the eighth filter 70H between separate transmit and receive signal paths in the transceiver circuitry 68. A filter response of the ninth filter 70I includes a pass band configured to pass RF receive signals within the first operating band (band A) while attenuating other signals. A filter response of the tenth filter 70J includes a pass band configured to pass RF receive signals within the second operating band (band B) while attenuating other signals. A filter response of the eleventh filter 70K includes a pass band configured to pass RF receive signals within the third operating band (band C) while attenuating other signals.

Notably, the first operating band (band A), the second operating band (band B), and the third operating band (band C) are FDD operating bands, while the fourth operating band (band D) is a TDD operating band. In one embodiment, the first filter 70A, the second filter 70B, the third filter 70C, the fourth filter 70D, the fifth filter 70E, the sixth filter 70F, and the eighth filter 70H are used for the primary transmission and reception of RF signals, while the seventh filter 70G, the ninth filter 70I, the tenth filter 70J, and the eleventh filter 70K are used for the reception of diversity multiple-input-multiple-output (MIMO) receive signals. In other words, the first multiplexer circuitry 72A is used for the primary transmission and reception of FDD RF signals, and for the reception of diversity MIMO TDD signals, while the second multiplexer circuitry 72B is used for the primary transmission and reception of TDD RF signals, and for the reception of diversity MIMO FDD signals. Providing the filters 70 in this manner allows for less loading on the first multiplexer circuitry 72A as a result of the seventh filter 70G than if the seventh filter 70G were used for the primary transmission and reception of RF signals within the fourth operating band (band D). Grouping FDD and TDD filters together in the first multiplexer circuitry 72A and the second multiplexer circuitry 72B allows for a reduction in the overall size of the RF filtering circuitry 64, both because the diplexers as shown in FIG. 3 are no longer required, and because of the combination of the individual TDD filters into the first multiplexer circuitry 72A and the second multiplexer circuitry 72B.

The RF front end circuitry 58 is capable of operating in a standard (i.e., non-carrier aggregation) mode in any one of the first operating band (band A), the second operating band (band B), the third operating band (band C), and the fourth operating band (band D). During standard modes, a first one of the antennas 60 is used to transmit and receive primary signals within a single operating band, while a second one of the antennas 60 is used to receive a diversity MIMO signal within the same operating band. As discussed above, the first multiplexer circuitry 72A is used for the primary transmission and reception of FDD RF signals and the reception of diversity MIMO signals for TDD RF signals, while the second multiplexer circuitry 72B is used for the primary transmission and reception of TDD RF signals and the reception of diversity MIMO signals for FDD RF signals. The particular one of the antennas 60 used for transmission may be changed based on one or more performance characteristics of each one of the antennas 60 (e.g., voltage standing wave ratio), and may be dynamically swapped by the antenna switching circuitry 62 in order to optimize transmission and/or reception. In particular, switch control circuitry 80 coupled to the antenna switching circuitry 62 may provide control signals to the antenna switching circuitry 62 in order to swap the first antenna 60A and the second antenna 60B. The antenna 60 with the most favorable transmission and/or reception characteristics is generally referred to as the "primary" antenna, and is used for the transmission and reception of primary RF signals. The antenna 60 with less favorable transmission and/or reception characteristics is generally referred to as the "secondary" antenna, and is used for the reception of diversity MIMO RF signals.

The RF front end circuitry 58 is further configured to operate in several carrier aggregation configurations in which bandwidth between the first operating band (band A), the second operating band (band B), the third operating band (band C), and the fourth operating band (band D) is aggregated. In the various carrier aggregation modes of the RF front end circuitry 58, an RF transmit signal in one of the operating bands is provided to either the first multiplexer circuitry 72A (in the case that the operating band is an FDD operating band) or the second multiplexer circuitry 72B (in the case that the operating band is a TDD operating band), where it is passed by the appropriate filter to one of the antennas 60. RF receive signals in two or more of the operating bands are received at both the first antenna 60A and the second antenna 60B and separately delivered to the transceiver circuitry 68 by the RF filtering circuitry 64. As discussed above, primary RF receive signals in the FDD operating bands are passed by the second filter 70B, the fourth filter 70D, and the sixth filter 70F in the first multiplexer circuitry 72A to the transceiver circuitry 68, while primary RF receive signals in the TDD operating bands are passed by the eighth filter 70H in the second multiplexer circuitry 72B to the transceiver circuitry 68. Further, diversity MIMO receive signals in the FDD operating bands are passed by the ninth filter 70I, the tenth filter 70J, and the eleventh filter 70K in the second multiplexer circuitry 72B to the transceiver circuitry 68, while diversity MIMO receive signals in the TDD operating bands are passed by the seventh filter 70G in the first multiplexer circuitry 72A to the transceiver circuitry 68.

Arranging the filters 70 and using them as discussed above allows for the overall size of the RF filtering circuitry 64 to be reduced when compared to conventional approaches. This is evident when considering that the diplexers shown in FIG. 3 are no longer necessary. Further, combining the filters 70 as described above minimizes the loading from the additional TDD filters on the first multiplexer circuitry 72A and the second multiplexer circuitry 72B such that the performance of the first multiplexer circuitry 72A and the second multiplexer circuitry 72B remains relatively unchanged compared to the multiplexer circuitry shown in FIG. 3 even with the additional functionality provided therein. Accordingly, the RF front end circuitry 58 may be used in carrier aggregation configurations between FDD operating bands and TDD operating bands with increased performance.

In one embodiment, the first operating band (band A) is long term evolution (LTE) band 1, the second operating band (band B) is LTE band 3, the third operating band (band C) is LTE band 7, and the fourth operating band (band D) is LTE band 40. However, the disclosure is not so limited. The principles of the present disclosure may be applied to any number of FDD and TDD operating bands, all of which are contemplated herein. As shown in FIG. 4, the antenna switching circuitry 32 is a dual-pole dual-throw (DPDT) switch; however, any suitable switching circuitry may be used for the antenna switching circuitry 32 without departing from the principles described herein. The filters 70 may be acoustic filters such as surface acoustic wave (SAW) filters, bulk acoustic wave (BAW) filters, or the like. Further, the filters 70 may be any other suitable filtering elements such as lumped LC filters or the like.

Figure 5:
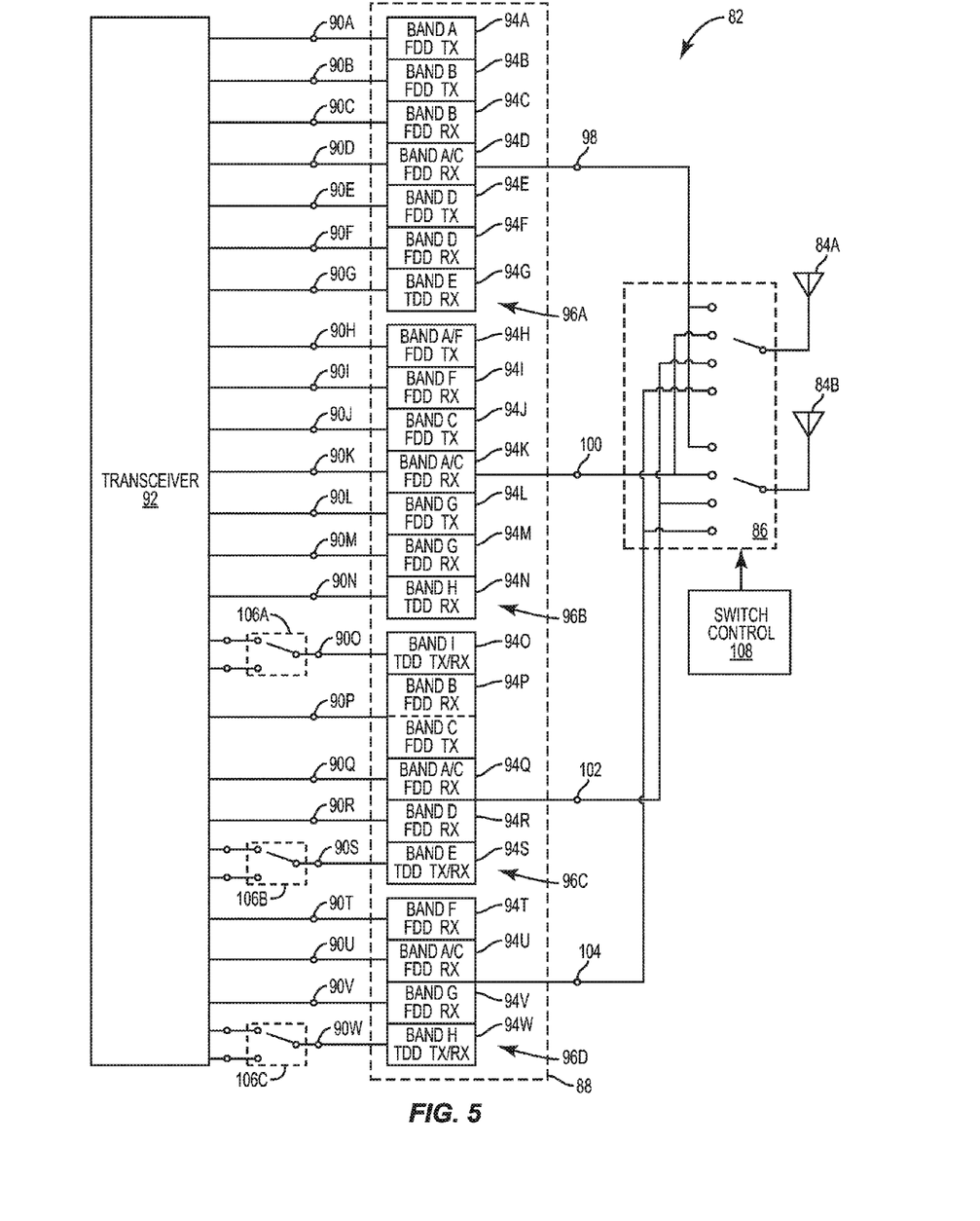
FIG. 5 is a schematic representation of RF front end circuitry according to one embodiment of the present disclosure.

FIG. 5 shows a schematic representation of RF front end circuitry 82 according to an additional embodiment of the present disclosure. The RF front end circuitry 82 includes a first antenna 84A, a second antenna 84B, antenna switching circuitry 86 coupled to the first antenna 84A and the second antenna 84B, RF filtering circuitry 88 coupled between the antenna switching circuitry 86 and a number of input/output nodes 90 (shown individually as 90A through 90W), and transceiver circuitry 92 coupled to the input/output nodes 90. The RF filtering circuitry 88 includes a number of filters 94 (shown individually as 94A through 94W), which are grouped into first multiplexer circuitry 96A, second multiplexer circuitry 96B, third multiplexer circuitry 96C, and fourth multiplexer circuitry 96D. Notably, the first multiplexer circuitry 96A, the second multiplexer circuitry 96B, the third multiplexer circuitry 96C, and the fourth multiplexer circuitry 96D each include filters 94 to support both FDD operating bands and TDD operating bands, as discussed in detail below.

The first multiplexer circuitry 96A includes a first filter 94A coupled between a first common node 98 and a first input/output node 90A, a second filter 94B coupled between the first common node 98 and a second input/output node 90B, a third filter 94C coupled between the first common node 98 and a third input/output node 90C, a fourth filter 94D coupled between the first common node 98 and a fourth input/output node 90D, a fifth filter 94E coupled between the first common node 98 and a fifth input/output node 90E, a sixth filter 94F coupled between the first common node 98 and a sixth input/output node 90F, and a seventh filter 94G coupled between the first common node and a seventh input/output node 90G.

The second multiplexer circuitry 96B includes an eighth filter 94H coupled between a second common node 100 and an eighth input/output node 90H, a ninth filter 94I coupled between the second common node 100 and a ninth input/output node 90I, a tenth filter 94J coupled between the second common node 100 and a tenth input/output node 90J, an eleventh filter 94K coupled between the second common node 100 and an eleventh input/output node 90K, a twelfth filter 94L coupled between the second common node 100 and a twelfth input/output node 90L, a thirteenth filter 94M coupled between the second common node 100 and a thirteenth input/output node 90M, and a fourteenth filter 94N coupled between the second common node 100 and a fourteenth input/output node 90N.

The third multiplexer circuitry 96C includes a fifteenth filter 94O coupled between a third common node 102 and a fifteenth input/output node 90O, a sixteenth filter 94P coupled between the third common node 102 and a sixteenth input/output node 90P, a seventeenth filter 94Q coupled between the third common node 102 and a seventeenth input/output node 90Q, an eighteenth filter 94R coupled between the third common node 102 and an eighteenth input/output node 90R, and a nineteenth filter 94S coupled between the third common node 102 and a nineteenth input/output node 90S.

The fourth multiplexer circuitry 96D includes a twentieth filter 94T coupled between a fourth common node 104 and a twentieth input/output node 90T, a twenty-first filter 94U coupled between the fourth common node 104 and a twenty-first input/output node 90U, a twenty-second filter 94V coupled between the fourth common node 104 and a twenty-second input/output node 90V, and a twenty-third filter 94W coupled between the fourth common node 104 and a twenty-third input/output node 90W.

The RF filtering circuitry 88 is configured to selectively pass RF transmit signals and RF receive signals within a first operating band (band A), a second operating band (band B), a third operating band (band C), a fourth operating band (band D), a fifth operating band (band E), a sixth operating band (band F), a seventh operating band (band G), an eighth operating band (band H), and a ninth operating band (band I) between the antenna switching circuitry 86 and the transceiver circuitry 92. The first operating band (band A), the second operating band (band B), the third operating band (band C), the fourth operating band (band D), the sixth operating band (band F), and the seventh operating band (band G) may be FDD operating bands, while the fifth operating band (band E), the eighth operating band (band H), and the ninth operating band (band I) may be TDD operating bands.

As shown in FIG. 5, a filter response of the first filter 94A includes a pass band configured to pass RF transmit signals within the first operating band (band A) while attenuating other signals. A filter response of the second filter 94B includes a pass band configured to pass RF transmit signals within the second operating band (band B) while attenuating other signals. A filter response of the third filter 94C includes a pass band configured to pass RF receive signals within the second operating band (band B) while attenuating other signals. A filter response of the fourth filter 94D includes a pass band configured to pass RF receive signals within the first operating band (band A) and the third operating band (band C) while attenuating other signals. A filter response of the fifth filter 94E includes a pass band configured to pass RF transmit signals within the fourth operating band (band D) while attenuating other signals. A filter response of the sixth filter 94F includes a pass band configured to pass RF receive signals within the fourth operating band (band D) while attenuating other signals. A filter response of the seventh filter 94G includes a pass band configured to pass RF receive signals within the fifth operating band (band E) while attenuating other signals.

A filter response of the eighth filter 94H includes a pass band configured to pass RF transmit signals within the first operating band (band A) and the sixth operating band (band F) while attenuating other signals. A filter response of the ninth filter 94I includes a pass band configured to pass RF receive signals within the sixth operating band (band F) while attenuating other signals. A filter response of the tenth filter 94J includes a pass band configured to pass RF transmit signals within the third operating band (band C) while attenuating other signals. A filter response of the eleventh filter 94K includes a pass band configured to pass RF receive signals within the first operating band (band A) and the third operating band (band C) while attenuating other signals. A filter response of the twelfth filter 94L includes a pass band configured to pass RF transmit signals within the seventh operating band (band G) while attenuating other signals. A filter response of the thirteenth filter 94M includes a pass band configured to pass RF receive signals within the seventh operating band (band G) while attenuating other signals. A filter response of the fourteenth filter 94N includes a filter response configured to pass RF receive signals within the eighth operating band (band H) while attenuating other signals.

A filter response of the fifteenth filter 94O includes a pass band configured to pass RF transmit and RF receive signals within the ninth operating band (band I) while attenuating other signals. Because the ninth operating band (band I) is a TDD operating band where RF transmit signals and RF receive signals are in the same frequency band, a first transmit/receive switch 106A is coupled between the fifteenth input/output node 90O and the transceiver circuitry 92 to switch the output of the fifteenth filter 94O between separate transmit and receive signal paths in the transceiver circuitry 92. A filter response of the sixteenth filter 94P includes a pass band configured to pass RF receive signals within the second operating band (band B) and RF transmit signals within the third operating band (band C), while attenuating other signals. A filter response of the seventeenth filter 94Q includes a pass band configured to pass RF receive signals within the first operating band (band A) and the third operating band (band C) while attenuating other signals. A filter response of the eighteenth filter 94R includes a pass band configured to pass RF receive signals within the fourth operating band (band D) while attenuating other signals. A filter response of the nineteenth filter 94S includes a pass band configured to pass RF transmit signals and RF receive signals within the fifth operating band (band E) while attenuating other signals. Because the fifth operating band (band E) is a TDD operating band where RF transmit signals and RF receive signals are in the same frequency band, a second transmit/receive switch 106B is coupled between the nineteenth input/output node 90S and the transceiver circuitry 92 to switch the output of the nineteenth filter 94S between separate transmit and receive signal paths in the transceiver circuitry 92.

A filter response of the twentieth filter 94T includes a pass band configured to pass RF receive signals within the sixth operating band (band F) while attenuating other signals. A filter response of the twenty-first filter 94U includes a pass band configured to pass RF receive signals within the first operating band (band A) and the third operating band (band C) while attenuating other signals. A filter response of the twenty-second filter 94V includes a pass band configured to pass RF receive signals within the seventh operating band (band G) while attenuating other signals. A filter response of the twenty-third filter 94W includes a pass band configured to pass RF transmit signals and RF receive signals within the eighth operating band (band H) while attenuating other signals. Because the eighth operating band (band H) is a TDD operating band where RF transmit signals and RF receive signals are in the same frequency band, a third transmit/receive switch 106C is coupled between the twenty-third input/output node 90W and the transceiver circuitry 92 to switch the output of the twenty-third filter 94W between separate transmit and receive signal paths in the transceiver circuitry 92.

Notably, the first operating band (band A), the second operating band (band B), the third operating band (band C), the fourth operating band (band D), the sixth operating band (band F), and the seventh operating band (band G) may be FDD operating bands, while the fifth operating band (band E), the eighth operating band (band H), and the ninth operating band (band I) may be TDD operating bands. In one embodiment, the first filter 94A, the second filter 94B, the third filter 94C, the fourth filter 94D, the fifth filter 94E, the sixth filter 94F, the eighth filter 94H, the ninth filter 94I, the tenth filter 94J, the eleventh filter 94K, the twelfth filter 94L, the thirteenth filter 94M, the fifteenth filter 94O, the nineteenth filter 94S, and the twenty-third filter 94W are used for the primary transmission and reception of RF signals, while the seventh filter 94G, the fourteenth filter 94N, the sixteenth filter 94P, the seventeenth filter 94Q, the eighteenth filter 94R, the twentieth filter 94T, the twenty-first filter 94U, and the twenty-second filter 94V are used for the reception of diversity MIMO receive signals. In other words, the first multiplexer circuitry 96A and the second multiplexer circuitry 96B are used for the primary transmission and reception of FDD RF signals, and for the reception of diversity MIMO TDD signals. The third multiplexer circuitry 96C and the fourth multiplexer circuitry 96D are used for the primary transmission and reception of TDD RF signals, and for the reception of diversity MIMO FDD signals. In some cases, a TDD operating band may not be used in association with diversity MIMO signals (e.g., in the ninth operating band, band I). Providing the filters 94 as discussed above allows for less loading on the first multiplexer circuitry 96A and the second multiplexer circuitry 96B as a result of the seventh filter 94G and the fourteenth filter 94N, respectively, than if the seventh filter 94G and the fourteenth filter 94N were used for the primary transmission and reception of TDD signals. Grouping FDD and TDD filters together as shown above allows for a reduction in the overall size of the RF filtering circuitry 88, both because additional diplexers are not required and because of the combination of individual TDD filters into the various multiplexer circuitry 96.

The RF front end circuitry 82 is configured to operate in a standard (i.e., non-carrier aggregation) mode in any one of the first operating band (band A), the second operating band (band B), the third operating band (band C), the fourth operating band (band D), the fifth operating band (band E), the sixth operating band (band F), the seventh operating band (band G), the eighth operating band (band H), and the ninth operating band (band I). During standard modes, a first one of the antennas 84 is used to transmit and receive signals with a single operating band, while a second one of the antennas 84 is used to receive a diversity MIMO signal within the same operating band. As discussed above, the first multiplexer circuitry 96A and the second multiplexer circuitry 96B are used for the primary transmission and reception of FDD RF signals, and the reception of diversity MIMO signals for TDD RF signals. Further, the third multiplexer circuitry 96C and the fourth multiplexer circuitry 96D are used for the primary transmission and reception of TDD RF signals, and the reception of diversity MIMO signals for FDD RF signals. The particular one of the antennas 84 used for transmission may be changed based on one or more performance characteristics of each one of the antennas 84 (e.g., voltage standing wave ratio), and may be dynamically swapped by the antenna switching circuitry 86 in order to optimize transmission and/or reception. In particular, switch control circuitry 108 coupled to the antenna switching circuitry 86 may provide control signals to the antenna switching circuitry 86 in order to swap the first antenna 86A and the second antenna 86B. The antenna 60 with the most favorable transmission and/or reception characteristics is generally referred to as the "primary" antenna, and is used for the transmission and reception of primary RF signals. The antenna 60 with less favorable transmission and/or reception characteristics is generally referred to as the "secondary" antenna, and is used for the reception of diversity MIMO RF signals.

The RF front end circuitry 82 is further configured to operate in several carrier aggregation configurations in which bandwidth between the first operating band (band A), the second operating band (band B), the third operating band (band C), the fourth operating band (band D), the fifth operating band (band D), the sixth operating band (band E), the seventh operating band (band F), the eighth operating band (band G), and the ninth operating band (band I) is aggregated. In the various carrier aggregation modes of the RF front end circuitry 82, an RF transmit signal in one of the operating bands is provided to either the first multiplexer circuitry 96A, the second multiplexer circuitry 96B, the third multiplexer circuitry 96C, or the fourth multiplexer circuitry 96D. If the RF transmit signal is within an FDD operating band, the transmit signal is provided to either the first multiplexer circuitry 96A or the second multiplexer circuitry 96B, depending on which one includes the appropriate transmit filter for the FDD operating band. If the RF transmit signal is within a TDD operating band, the transmit signal is provided to either the third multiplexer circuitry 96C or the fourth multiplexer circuitry 96D, depending on which one includes the appropriate transmit filter for the TDD operating band. The multiplexer circuitry 96 that receives the RF transmit signal passes the signal via the appropriate filter to one of the antennas 84 for transmission.

RF receive signals in two or more of the operating bands are received at both the first antenna 86A and the second antenna 86B and separately delivered to the transceiver circuitry 92 by the RF filtering circuitry 88. As discussed above, the first multiplexer circuitry 96A and the second multiplexer circuitry 96B are used for the primary transmission and reception of FDD RF signals, and the reception of diversity MIMO signals for TDD RF signals. Further, the third multiplexer circuitry 96C and the fourth multiplexer circuitry 96D are used for the primary transmission and reception of TDD RF signals, and the reception of diversity MIMO signals for FDD RF signals.

Arranging the filters 94 and using them as discussed above allows for the overall size of the RF filtering circuitry 88 to be reduced when compared to conventional approaches. This is evident considering that the diplexers shown in FIG. 3 are no longer necessary. Further, combining the filters 94 as discussed above minimizes the loading on the multiplexer circuitry 96 such that the performance of the multiplexer circuitry 96 remains relatively similar even with the additional functionality provided therein. Accordingly, the RF front end circuitry 82 may be used in carrier aggregation configurations between FDD operating bands and TDD operating bands with increased performance.

In one embodiment, the first operating band (band A) is LTE band 4, the second operating band (band B) is LTE band 25, the third operating band (band C) is LTE band 1, the fourth operating band (band D) is LTE band 30, the fifth operating band (band E) is LTE band 41, the sixth operating band (band F) is LTE band 3, the seventh operating band (band G) is LTE band 7, the eighth operating band (band H) is LTE band 40, and the ninth operating band (band I) is LTE band 39. However, the disclosure is not so limited. The principles of the present disclosure may be applied to any number of FDD and TDD operating bands, all of which are contemplated herein. As shown in FIG. 5, the antenna switching circuitry 86 is a dual-pole four-throw (DP4T) switch, however, any suitable switching circuitry may be used for the antenna switching circuitry 86 without departing from the principles described herein. The filters 94 may be acoustic filters such as SAW filters, BAW filters, or the like. Further, the filters 94 may be any other suitable filtering elements such as lumped LC filters or the like.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) front end circuitry comprising:
a plurality of antenna nodes;
antenna switching circuitry coupled to the plurality of antenna nodes;
a plurality of input/output nodes;
transceiver circuitry coupled to the plurality of input/output nodes; and
RF filtering circuitry coupled between the antenna switching circuitry and the plurality of input/output nodes, the RF filtering circuitry comprising:
first multiplexer circuitry including a first plurality of filters configured to pass primary RF transmit signals within one or more frequency division duplexing (FDD) operating bands, primary RF receive signals within the one or more FDD operating bands, and diversity multiple-input-multiple-output (MIMO) receive signals within one or more time division duplexing (TDD) operating bands between the antenna switching circuitry and different ones of the plurality of input/output nodes while attenuating other signals; and
second multiplexer circuitry including a second plurality of filters configured to pass primary RF transmit signals within the one or more TDD operating bands, primary RF receive signals within the one or more TDD operating bands, and diversity MIMO receive signals within the one or more FDD operating bands between the antenna switching circuitry and different ones of the plurality of input/output nodes while attenuating other signals; and at least one transmit/receive switch coupled between one of the second plurality of filters and the transceiver circuitry and configured to selectively couple the one of the second plurality of filters to one of a transmit signal path and a receive signal path in the transceiver circuitry such that the primary RF transmit signals within the one or more TDD operating bands are provided to the transmit signal path and the primary RF receive signals within the one or more TDD operating bands are provided to the receive signal path.

2. The RF front end circuitry of claim 1 wherein the one or more FDD operating bands include at least a first FDD operating band, a second FDD operating band, and a third FDD operating band.

3. The RF front end circuitry of claim 2 wherein:
the one or more TDD operating bands include at least long term evolution (LTE) band 40; and
the first FDD operating band is LTE band 1, the second FDD operating band is LTE band 3, and the third FDD operating band is LTE band 7.

4. The RF front end circuitry of claim 3 wherein the RF front end circuitry is configured to aggregate bandwidth between the one or more FDD operating bands and the one or more TDD operating bands.

5. The RF front end circuitry of claim 1 further comprising a plurality of antennas each coupled to a different one of the plurality of antenna nodes.

6. The RF front end circuitry of claim 5 further comprising switch control circuitry configured to:
when a TDD signal is being transmitted from the RF front end circuitry, couple the second multiplexer circuitry to a primary one of the plurality of antennas and couple the first multiplexer circuitry to a secondary one of the antennas; and
when an FDD signal is being transmitted from the RF front end circuitry, couple the first multiplexer circuitry to a primary one of the antennas and couple the second multiplexer circuitry to a secondary one of the antennas.

7. The RF front end circuitry of claim 1 wherein the first plurality of filters comprises:
a first filter coupled between a first input/output node and a first common node;
a second filter coupled between a second input/output node and the first common node;
a third filter coupled between a third input/output node and the first common node;
a fourth filter coupled between a fourth input/output node and the first common node;
a fifth filter coupled between a fifth input/output node and the first common node;
a sixth filter coupled between a sixth input/output node and the first common node; and
a seventh filter coupled between a seventh input/output node and the first common node.

8. The RF front end circuitry of claim 7 wherein:
a filter response of the first filter includes a pass band configured to pass primary RF transmit signals within a first FDD operating band while attenuating other signals;
a filter response of the second filter includes a pass band configured to pass primary RF receive signals within the first FDD operating band while attenuating other signals;

a filter response of the third filter includes a pass band configured to pass primary RF transmit signals within a second FDD operating band while attenuating other signals;
a filter response of the fourth filter includes a pass band configured to pass primary RF receive signals within the second FDD operating band while attenuating other signals;
a filter response of the fifth filter includes a pass band configured to pass primary RF transmit signals within a third FDD operating band while attenuating other signals;
a filter response of the sixth filter includes a pass band configured to pass primary RF receive signals within the third FDD operating band while attenuating other signals; and
a filter response of the seventh filter includes a pass band configured to pass diversity MIMO receive signals within a first TDD operating band while attenuating other signals.

9. The RF front end circuitry of claim 8 wherein the second plurality of filters comprises:
an eighth filter coupled between an eighth input/output node and a second common node;
a ninth filter coupled between a ninth input/output node and the second common node;
a tenth filter coupled between a tenth input/output node and the second common node; and
an eleventh filter coupled between an eleventh input/output node and the second common node.

10. The RF front end circuitry of claim 9 wherein:
a filter response of the eighth filter includes a pass band configured to pass primary RF transmit signals and primary RF receive signals within the first TDD operating band while attenuating other signals;
a filter response of the ninth filter includes a pass band configured to pass diversity MIMO receive signals within the first FDD operating band while attenuating other signals;
a filter response of the tenth filter includes a pass band configured to pass diversity MIMO receive signals within the second FDD operating band while attenuating other signals; and
a filter response of the eleventh filter includes a pass band configured to pass diversity MIMO receive signals within the third FDD operating band while attenuating other signals.

11. The RF front end circuitry of claim 10 wherein the RF front end circuitry is configured to aggregate bandwidth between the first FDD operating band, the second FDD operating band, the third FDD operating band, and the first TDD operating band.

12. The RF front end circuitry of claim 11 wherein the first FDD operating band is Long Term Evolution (LTE) band 1, the second FDD operating band is LTE band 3, the third FDD operating band is LTE band 7, and the first TDD operating band is LTE band 40.

13. The RF front end circuitry of claim 12 further comprising a plurality of antennas each coupled to a different one of the plurality of antenna nodes.

14. The RF front end circuitry of claim 13 further comprising switch control circuitry configured to:
when a TDD signal is being transmitted from the RF front end circuitry, couple the second multiplexer circuitry to a primary one of the plurality of antennas and couple the first multiplexer circuitry to a secondary one of the antennas; and when an FDD signal is being transmitted from the RF front end circuitry, couple the first multiplexer circuitry to a primary one of the antennas and couple the second multiplexer circuitry to a secondary one of the antennas.

15. The RF front end circuitry of claim 9 further comprising a plurality of antennas each coupled to a different one of the plurality of antenna nodes.

16. The RF front end circuitry of claim 15 further comprising switch control circuitry configured to:
   when a TDD signal is being transmitted from the RF front end circuitry, couple the second multiplexer circuitry to a primary one of the plurality of antennas and couple the first multiplexer circuitry to a secondary one of the antennas; and
   when an FDD signal is being transmitted from the RF front end circuitry, couple the first multiplexer circuitry to a primary one of the antennas and couple the second multiplexer circuitry to a secondary one of the antennas.

\* \* \* \* \*